United States Patent [19]

Arets et al.

[11] Patent Number: 4,562,563
[45] Date of Patent: Dec. 31, 1985

[54] RECORD-DISC PLAYER COMPRISING A BRAKING MECHANISM FOR BRAKING A DISC

[75] Inventors: Jan W. Arets; Bernardus J. Stinessen, both of Eindhoven, Netherlands

[73] Assignee: U.S. Philips Corporation, New York, N.Y.

[21] Appl. No.: 583,070

[22] Filed: Feb. 23, 1984

[30] Foreign Application Priority Data

Feb. 28, 1983 [NL] Netherlands ............... 8300731

[51] Int. Cl.⁴ .............................................. G11B 1/00
[52] U.S. Cl. ...................................... 369/79; 369/268
[58] Field of Search ........................ 369/79, 268, 270

[56] References Cited

U.S. PATENT DOCUMENTS

| 3,953,036 | 4/1976 | Yamamoto | 369/79 |
| 4,032,971 | 6/1977 | Camerik | 369/79 |
| 4,063,286 | 12/1977 | Takahara et al. | 369/79 |
| 4,068,851 | 1/1978 | Yamamura | 369/270 |
| 4,092,671 | 5/1978 | Camerik | 369/79 |
| 4,412,320 | 10/1983 | Yamakawa | 369/79 |

FOREIGN PATENT DOCUMENTS 19667 of 1912 United Kingdom ............... 369/268

Primary Examiner—Steven L. Stephan
Attorney, Agent, or Firm—Robert S. Smith

[57] ABSTRACT

In a record-disc player comprising a disc-braking mechanism the turntable (7) is covered by a lid (14) which is pivotally connected to a housing (3). The lid (14) is latched in a closed position by means of a latching mechanism (30). A brake lever (21) is pivotally connected to the lid (14) and carries a braking element (23) and a stop element (24) arranged on opposite sides of the pivot. The latching mechanism (30) can be released by exerting pressure on the lid (14), the stop element (24) engaging with a stop portion (44) as a result of the pressure exerted on the lid. By the pivotal movement of the lever (21) relative to the lid (14) a braking torque is exerted on the disc loader (20) by the braking element (23), so that the disc (13) is stopped.

6 Claims, 7 Drawing Figures

RECORD-DISC PLAYER COMPRISING A BRAKING MECHANISM FOR BRAKING A DISC

The invention relates to a record-disc player with a braking mechanism for braking a record disc, the player comprising a housing, a turntable which is rotated by a motor, and a lid which is pivotally connected to the housing and which can be latched in a closed position relative to the housing by means of a latching mechanism and which carries a disc loader, and the braking mechanism being operable to stop the disc after the lid has been unlatched and comprising a brake lever which is pivotable about a pivotal axis and which cooperates with the lid and is provided with a braking element and a stop element which are situated on opposite sides of the pivotal axis of the lever.

A disc player of this type is disclosed in U.S. Pat. No. 4,032,971. In such a disc player the turntable is braked by the braking mechanism when the lid is swung open, so that the disc can be removed when the turntable has stopped. This known disc player, in which the speed of the turntable has to be controlled within specific accurate limits, comprises a turntable with a low internal friction. Moreover, since during operation the turntable rotates at a comparatively high speed, the time between the instant at which the braking mechanism is applied and the turntable has stopped is fairly long, so that after the lid has been swung open the user has to wait a few seconds before he can remove the disc.

It is the object of the invention to construct the braking mechanism in such a disc player in such a way that the user can remove the disc almost immediately after the lid has been swung open.

To this end the invention is characterized in that the brake lever is pivotally connected to the lid, the braking element is cooperable with the disc loader and the stop element is cooperable with a stop portion of the housing, and the latching mechanism can be released by exerting pressure on the lid in response to which the lid performs a pivotal movement towards the housing, the stop element is urged against the stop portion, the brake lever is pivoted relative to the lid, and the braking element stops the disc by exerting a braking torque on the disc loader.

In this way the disc is braked immediately after unlatching of the lid, a direct braking action being exerted on the disc by the action of the braking mechanism on the disc loader. The invention has the advantage that the use of the lever which is carried by the lid results in a rapid and comparatively long engagement of the braking element with the disc loader and in the disc thus being braked. This allows the user to remove the disc from the disc player almost immediately after the lid has been unlatched and swung open.

A preferred embodiment of a disc player in accordance with the invention is characterized in that the distance between the stop element and the pivotal axis of the brake lever is smaller than the distance between the braking element and the pivotal axis.

This enables a rapid and effective engagement of the brake to be obtained with a small pivotal movement of the lid when the latching mechanism is released.

In this respect a further embodiment of a disc player in accordance with the invention is characterized in that the pivotal axis of the brake lever extends parallel to and near an edge of the lid which extends perpendicularly to the pivotal axis of the lid. This results in an optimum leverage of the parts of the lever on each side of the pivotal axis, so that an optimum braking torque can be exerted on the disc.

A further embodiment of a disc player in accordance with the invention is characterized in that the brake lever is made of a resilient material and the stop element of the brake lever comprises a projecting limb which is spaced by recesses in the brake lever from arms which are disposed on opposite sides of the limbs and through which the brake lever is connected to the pivot of this lever. In this way a braking mechanism is obtained which cannot be damaged by an excessive pressure on the lid during unlatching. The recesses in the resilient material effectively compensate for tolerances which may occur in the brake lever itself and which may occur during assembly. Moreover, this construction enables an optimum braking torque to be exerted on the disc via the disc loader.

Embodiments of the invention will now be described in more detail, by way of example, with reference to the drawings, in which FIG. 1 is an exploded perspective view of a first embodiment of the disc player in accordance with the invention;

Figure 1:
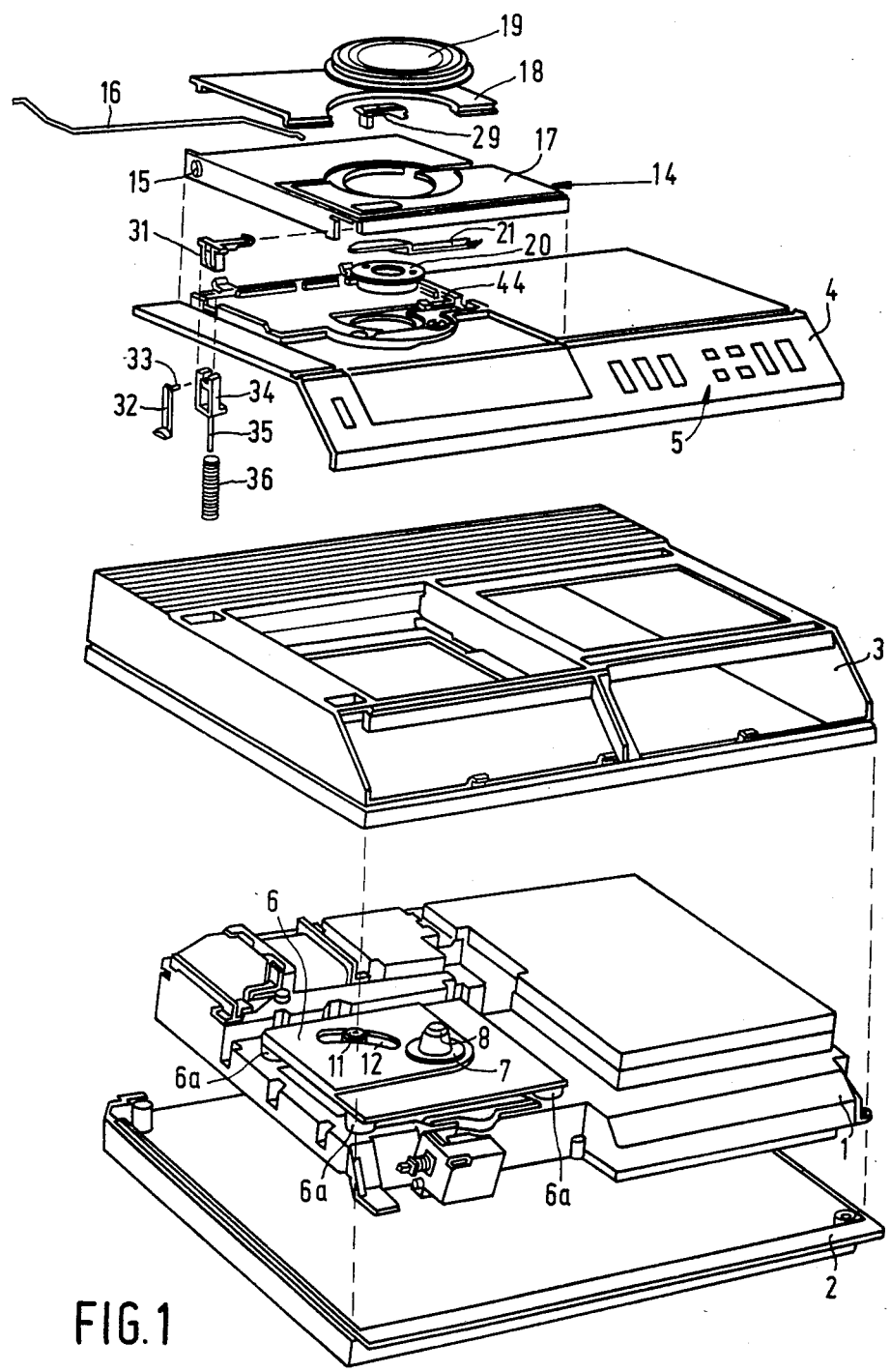
Figure 3:
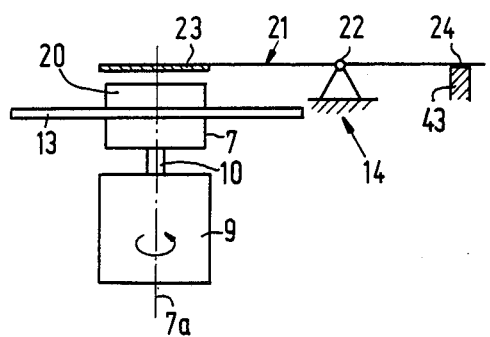
FIG. 3 shows schematically the positions of some of the relevant parts of the disc player relative to each other during normal operation.
Figure 4:
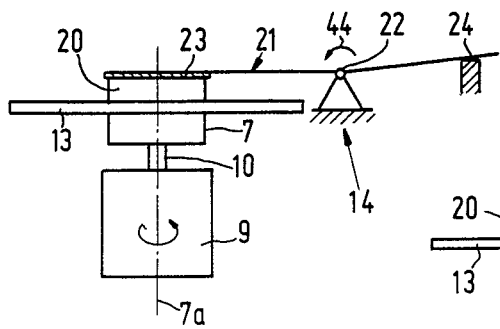
FIG. 4 shows the operation of some of the relevant parts of the disc player during unlatching of the lid.

The disc player shown in FIG. 1 comprises a frame 1 which is secured to a bottom plate 2. A housing 3 extends over the frame 1 and is connected to the bottom plate 2, on top of the housing a cover 4 is arranged which carries a plurality of control buttons 5. The frame 1 carries a sub-frame 6, which is connected to the frame 1 by four elastic supports 6a. The sub-frame 6 carries a turntable 7 on whose upper side a disc-centering member 8 is arranged. Underneath the turntable 7 a drive motor 9 is mounted, as shown in FIGS. 3 and 4. The disc drive system, comprising the drive motor 9, an idler 10 and the turntable 7, is connected to the sub-frame 6 in such a way that during rotation of the drive system the internal friction is minimal. This is necessary because during operation the turntable speed must be controlled within accurate limits.

The sub-frame 6 further carries an optical read head 11, which projects from the sub-frame 6 through a slot 12. In a manner not shown the read head 11 is connected to a mechanism which enables the read head to be positioned relative to the axis of rotation 7a of the turntable 7. The read head 11 comprises an objective (not shown) and a laser unit (not shown), which during operation emits a sharply focused light beam towards a record disc 13 placed on the turntable 7. The disc 13 is an information carrier for audio and/or video signals and has the property that it reflects the light beam emitted by the read head 11. The read head 11 receives the reflected beam and converts it into a signal which is transmitted to other parts of the disc player.

On the upper side of the cover 4 is a lid 14 which is pivotally connected to the housing 3 by a spindle 15. A spring 16 urges the lid away from the cover 4 towards an open position.

Figure 2:
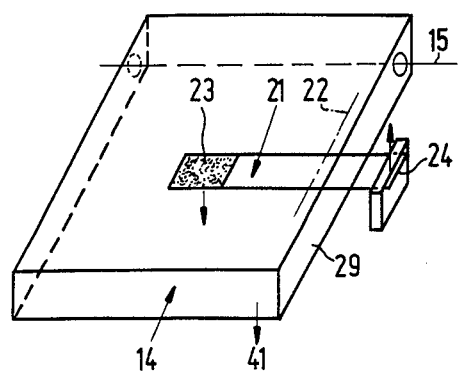
FIG. 2 shows schematically some parts of the disc player which are relevant to the invention.
Figure 6:
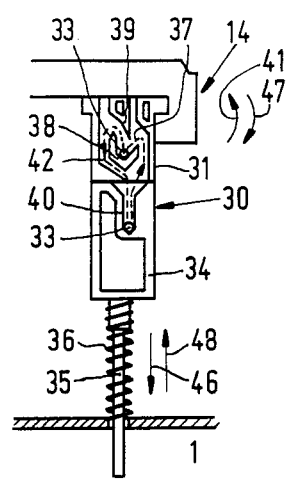
FIG. 6 shows a part of the brake lever of an embodiment of the disc player in accordance with the invention.

The lid 14 comprises a transparent main portion 17, on whose upper side an opaque portion 18 is arranged at the side of the spindle 15 in such a way that the light beam issuing from the light pen 11 is shielded even in the closed position of the lid, if there is no disc on the turntable. On the upper side of the lid 14 a circular disc 19 is arranged. In the space between the disc 19 and the transparent portion 17 is an annular disc loader 20, by which a record disc 13 placed on the turntable 7 is firmly pressed onto the turntable 7 when the lid 14 is swung into the closed position, the disc-centering member 8 ensuring that the disc is centered accurately relative to the axis of rotation 7a. On the upper side of the lid 14 a brake lever 21 is pivotally connected to the lid. In the present embodiment the brake lever 21 is constructed as a leaf or blade spring and adjacent its ends, which are situated on opposite sides of the pivot 22 of the lever, comprises a braking element 23 and a stop element 24 respectively. The braking element 23 is provided with a friction material on the side which faces the disc loader. Alternatively, the disc loader 20, instead of the brake element 23, may be provided with a friction material on the side facing the record disc 13. As is shown in FIG. 6, the stop element 24 of the brake lever 21 comprises a projecting limb having preferably a somewhat curved shape. As will be seen from FIGS. 1 and 2 the brake lever 21 is elongated, in the preferred embodiment, in a direction which is parallel to the axis of the spindle 15. The brake lever is formed with two arms 25 and 26 which are disposed on opposite sides of the limb 24 and are spaced from the limb by slots or elongate recesses in the brake lever. The arms 25 and 26 have a smaller length than the limb 24 and are clamped on both the transparent portion 17 and the opaque portion 18 of the lid 14 by the pins 27 and 28. The connections between the pins 27 and 28 and the arms 25 and 26 constitute the pivot 22. As is shown in FIG. 2, the axis of the pivot 22 is disposed near an edge 14a of the lid 14, which edge extends perpendicularly to the spindle 15. The axis of the pivot 22 extends parallel to the edge 14a. As a result of this arrangement the distance between the stop element 24 and the axis of the pivot 22 is smaller than the distance between the axis of the pivot 22 and the brake element 23. For an optimum cooperation of the brake element 23 with the disc loader 20 the braking element 23 is preferably situated nearer the disc 19 than the remainder of the brake lever 21. In the preferred embodiment the brake element 23 has a partly circular shape. Thus, the brake lever 21 forms a braking mechanism for braking the disc 13.

On the upper side the lid 14 carries a button 29 as shown in FIG. 1.

Figure 7:
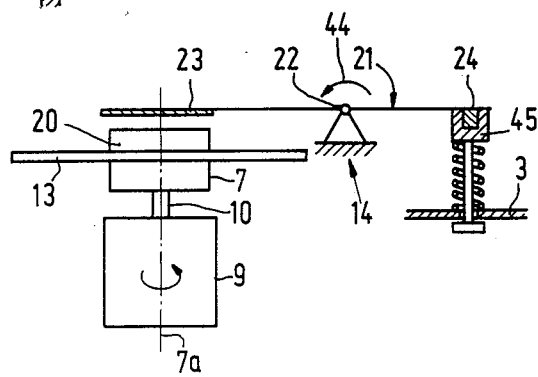
FIG. 7 shows schematically some of the relevant parts of a second embodiment of the invention.
Figure 5:
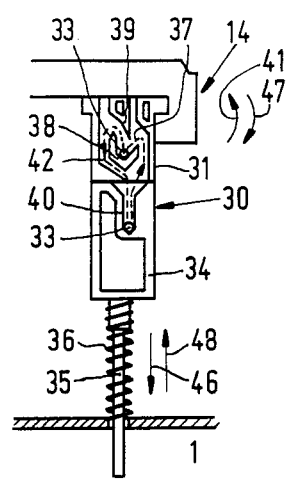
FIG. 5 is a partially schematic view of the latching mechanism for the lid.

The button 29 is coupled to a latching mechanism 30 which comprises a latching member 31 carried by the lid 14 and an extender 32 which is connected to the frame 1 and which carries a pin 33. Moreover, the latching mechanism 30 also comprises a vertically movable support 34 which is connected to a pin 35 which extends through a hole in the frame 1. A compression spring 36 urges the support 34 away from the frame. In the latching member 31 a guide path 37 for the pin 33 is formed as shown in FIG. 5. For this purpose a V-shaped guiding-edge 38 is formed in the latching member 31, whereas a projection 39 is disposed in the upper part of the latching member 31 above the guiding edge 38. In the closed position of the lid 14 shown in FIG. 5 the latching member 31 is positioned against the support 34, so that a trough-shaped recess 40 in the side wall of the support 34 adjoins the guidepath 37 in the latching member 31. In the closed position of the lid 14 the pin 33 is situated in the corner of the edge 38, so that the lid 14 is latched. For opening the lid 14 the user must press the button 29 so that the lid is pivoted as indicated by the arrow 41 in FIGS. 2 and 5. As a result of the pressure exerted on the lid the brake lever 21 is moved towards the frame 1, the stop element 24 being urged against a stop portion 43 on the housing 3. As the lid is pressed further the brake lever 21 effects a pivotal movement about the pivot 22 as indicated by the arrow 44, the brake lever being urged against the disc loader 20 with the braking element 23 and the disc 13 being braked via the disc loader 20 as shown in FIG. 4. The resilient construction of the brake lever 21 results in an elastic braking action via the disc loader 20, so that the brake lever 21 cannot be damaged by the pressure exerted on the lid 14. However, it is to be noted that in an alternative embodiment shown in FIG. 7 the brake lever 21 may have a rigid construction, a stop portion 45 being moved towards the housing 3 against spring pressure when the brake lever 21 is pivoted in the direction indicated by the arrow 44.

Thus, when the lid 14 is pressed into the closed position a braking torque is exerted on the disc 13, which stops rapidly when the lid 14 is unlatched. The braking time can be approximately half a second. The braking torque which is exerted also leads to a higher slipping torque in the disc-drive system comprising the motor 9 and the turntable 7. In view of the low internal friction of the disc-drive system this increased slipping torque is important in order to enable the disc to be braked rapidly. By arranging the mechanical advantage of the brake lever 21, so that the braking element 23 is disposed at a greater distance from the pivot 22 than the stop element 24, a small decoupling stroke of the lid 14 enables a fast action and also a comparatively long application of the braking element to be obtained when the lid is unlatched.

As a result of the movement of the pin 33 in the guidepath 37 past the projection 39, the support 34 has moved towards the frame 1 against the pressure of the spring 36 in the direction indicated by the arrow 46 in FIG. 5. When the lid 14 is released after the passage of the corner point of the guiding edge 38 the lid can pivot into the open position about the spindle 15 as indicated by the arrow 47. In this position of the lid the disc can be removed from the turntable. As a result of the fast action of the braking mechanism the disc 13 is stopped simultaneously. As a result of the movement of the lid 14 in the direction indicated by the arrow 47 the spring 36 moves the support 34 away from the frame 1 in the direction indicated by the arrow 48. As a result of this movement the pin 33 has engaged the lower end of the recess 40. This is the position of the pin in the open position of the lid 14. If the lid 14 is again swung into the closed position in the direction indicated by the arrow 41 the pin 33, after coupling of the support 34 with the latching member 31, again moves in the guidepath 37 as indicated by the arrow 42, the support 34 again being moved towards the frame 1 in the direction indicated by the arrow 46 against the force exerted by the spring 36. Thus, via the guidepath 37 the pin moves towards the position between the limbs of the V-shaped edge. In this position the lid 14 is latched again and the disc 13 can be played. The brake lever 21 then occupies the position shown in FIG. 3, with the braking element 23 spaced apart from the disc loader 20.

In both embodiments shown the braking mechanism has the property that after the lid 14 has been unlatched the disc 13 is stopped, which is possible as a result of the construction of the latching mechanism 30, which is released by exerting pressure on the lid 14.

A disc player in accordance with the invention may be a player of the type intended for playing optical video discs, optical audio discs and also optical storage discs for computer data. For all these uses the disc-drive system must have a low internal friction, the disc speed must be controlled accurately and the disc, which rotates rapidly during operation, must be braked rapidly.

What is claimed is:

1. A record-disc player with a braking mechanism for braking a record disc, the player comprising a housing, a turntable which is rotated by a motor, and a lid which is pivotally connected to the housing and means for latching said lid in a closed position relative to the housing, said means for latching including a latching mechanism, said payer also including means for loading a disc, the braking mechanism being operable to stop the disc after the lid has been unlatched and comprising a brake lever which is pivotable about a pivotal axis and which cooperates with the lid and which is provided with a braking element and a stop element on opposite sides of the pivotal axis of the brake lever, the brake lever being pivotally connected to the lid, the braking element cooperating with the means for loading a disc and the stop element cooperating with a stop portion of the housing, and the means for latching including means for releasing responsive to exertion of pressure on the lid in response to which the lid performs a pivotal movement towards the housing, the stop element is urged against the stop portion, the brake lever is pivoted relative to the lid, and the braking element stops the disc by exerting a braking torque on the disc loader.

2. A disc player as claimed in claim 1, wherein the distance between the stop element and the pivotal axis of the brake lever is smaller than the distance between the braking element and said pivotal axis.

3. A disc player as claimed in claim 2, wherein the pivotal axis of the brake lever extends parallel to and near an edge of the lid which extends substantially perpendicularly to the pivotal axis of the lid.

4. A disc player as claimed in claim 1, wherein the brake lever is made of a resilient material and the stop element of the brake lever comprises a projecting limb which is spaced by recesses in the brake lever from arms which are disposed on opposite sides of the limb and through which the brake lever is connected to the pivot of the brake lever.

5. A disc player as claimed in claim 2, wherein the brake lever is made of a resilient material and the stop element of the brake lever comprises a projecting limb which is spaced by recesses in the brake lever from arms which are disposed on opposite sides of the limb and through which the brake lever is connected to the pivot of the brake lever.

6. A disc player as claimed in claim 3, wherein the brake lever is made of a resilient material and the stop element of the brake lever comprises a projecting limb which is spaced by recesses in the brake lever from arms which are disposed on opposite sides of the limb and through which the brake lever is connected to the pivot of the brake lever.

* * * * *